United States Patent [19]

Bata

[11] Patent Number: 5,427,319
[45] Date of Patent: Jun. 27, 1995

[54] FUEL INJECTOR ARMATURE ASSEMBLY

[75] Inventor: George T. Bata, Grafton, Va.

[73] Assignee: Siemens Automotive L.P., Auburn Hills, Mich.

[21] Appl. No.: 217,582

[22] Filed: Mar. 24, 1994

[51] Int. Cl.6 ............................................. F02M 51/06
[52] U.S. Cl. .................................. 239/585.4; 239/600
[58] Field of Search ................... 239/600, 585.1, 585.4, 239/585.5; 251/129.21, 129.01

[56] References Cited

U.S. PATENT DOCUMENTS

| 3,702,683 | 11/1972 | Sturmer | 239/585.4 |
|---|---|---|---|
| 4,331,317 | 5/1982 | Hensley | 239/585.5 X |
| 4,509,693 | 4/1985 | Nakai | 239/585.5 |
| 4,610,080 | 9/1986 | Kamai et al. | 239/585.4 X |
| 5,207,387 | 5/1993 | Bengstrom | 251/129.21 X |

FOREIGN PATENT DOCUMENTS 214717 4/1961 Germany ...................... 251/129.21

Primary Examiner—Andres Kashnikow
Assistant Examiner—Kevin P. Weldon
Attorney, Agent, or Firm—Russel C. Wells

[57] ABSTRACT

A solenoid-operated top-feed fuel injector has a housing which contains a solenoid coil that is selectively energized by electric current to open and close the fuel injector. An inlet connector tube extends into the housing to convey pressurized liquid fuel into an internal fuel passage. Fuel is injected from the nozzle at the bottom. An armature assembly that has a needle valve joined to an armature is disposed within the fuel passage between the inlet connector tube and the outlet, and is spring-biased by a helical spring to seat the tip of the needle valve on a valve seat proximate the nozzle. Slot structure is formed in the armature during its fabrication by a metal injection molding or sintering process. The needle is inserted into the smaller diameter portion and the two are crimped together. Crimping tool access is through the slot structure, which also provides a path for fuel to flow past the armature. In one embodiment fuel can pass axially through the I.D. of the bias spring directly to the slot structure without having to pass radially through the helical free space between convolutions of the helix.

19 Claims, 2 Drawing Sheets

FUEL INJECTOR ARMATURE ASSEMBLY

FIELD OF THE INVENTION

This invention relates generally to electrically operated valves, such as fuel injectors for injecting liquid fuel into an internal combustion engine, and particularly to a novel armature assembly for a top-feed, solenoid-operated fuel injector.

BACKGROUND AND SUMMARY OF THE INVENTION

The movement of certain electrically-operated valves, such as certain fuel injectors, comprises an armature assembly that consists of a valve, in the form of a hardened stainless steel needle, that is joined to a ferromagnetic armature. The needle must be relatively harder than the armature to provide durability for withstanding the repeated impacting of the former's rounded tip with a valve seat proximate a nozzle end of the fuel injector. The armature is relatively softer because it must provide the requisite ferromagnetic properties that allow it to be efficiently magnetically attracted to a solenoid when the solenoid is energized to cause the armature assembly to lift the needle off the valve seat against an opposite spring bias that urges the armature assembly toward a seated condition on the seat.

A known embodiment of armature is a machined part having a larger diameter, thimble-shaped portion that is necked down to a smaller diameter, tubular-shaped portion extending coaxially from the base of the thimble-shaped portion. Joining of the needle to the armature is performed by first inserting the end of the needle opposite the needle tip into the smaller diameter portion of the armature and then crimping them together. Crimping can be performed without interference from the thimble-shaped portion of the armature by making the smaller diameter portion sufficiently long. The sidewall of the thimble-shaped portion has a fairly close fit to an internal bore that forms a portion of an internal fuel passage through the fuel injector, and it may in fact be used for guiding the armature assembly motion. One or more fuel holes are drilled through the end wall of the thimble-shaped portion just outside of the smaller diameter neck portion to provide for fuel to pass on its way through the fuel passage to the nozzle end where it is injected into the engine. It is also typical for one or more annular-shaped needle guides, or washers, to engage the needle for guiding the armature assembly motion, and they too have one or more fuel holes allowing fuel to pass through.

While prevailing manufacturing practices include thorough cleaning of machined parts like the armature, it has been discovered that minute metal fragments, burrs, etc. resulting from machining operations may remain attached during part cleaning only to separate at a later time during use of the fuel injector and then become a potential source of contamination. While any such debris that is internally generated after fabrication of a fuel injector may be promptly flushed from the valve without ill effect, entrapment of a debris fragment between the needle tip and the valve seat may occasion minute fuel leakage from the nozzle when the valve is closed, and given the tendency of regulatory authorities to impose increasingly stringent standards on tailpipe emissions of motor vehicles, even minute leakage can be a significant contributor to undesired emission products. Even if a valve is provided with some internal means of containing separated particles, such as a filter or trap, the inclusion of such a means does add to the unit cost, and at that may be insufficient to guarantee that every mass-produced fuel injector will not be susceptible to a degradation in performance due to this sort of internally originating debris.

Another factor affecting fuel injector performance is the phenomenon known as armature bounce. The occurrence of such bounce due to the needle impacting the seat at closing causes the injector to be open slightly longer than intended, and this too may be a significant contributor to tailpipe emissions when exhaust emission regulations are stringent. Various forms of armature bounce dampers have been proposed, but they too add to the unit cost of a fuel injector. Since bounce is a function of armature mass, reduction in armature mass will contribute to minimizing or eliminating undesired armature bounce.

The present invention relates to a new and improved form of armature that can provide for the elimination of machining operations on it and for reduction in its mass, while still providing both for it to serve as part of the armature assembly guidance scheme and for the needle to be joined to it by a convenient staking operation. Generally speaking, the invention contemplates the armature being fabricated by a powdered-metal process or a metal-injection molding process with a unique integral slot structure that provides both the fuel holes that allow fuel to pass through and also tool access for the staking of the needle to it. Details will be seen in the ensuing description and claims that are accompanied by drawings illustrating a presently preferred embodiment of the invention according to the best mode presently contemplated in carrying out the invention.

DESCRIPTION OF THE PREFERRED EMBODIMENT

Figure 1:
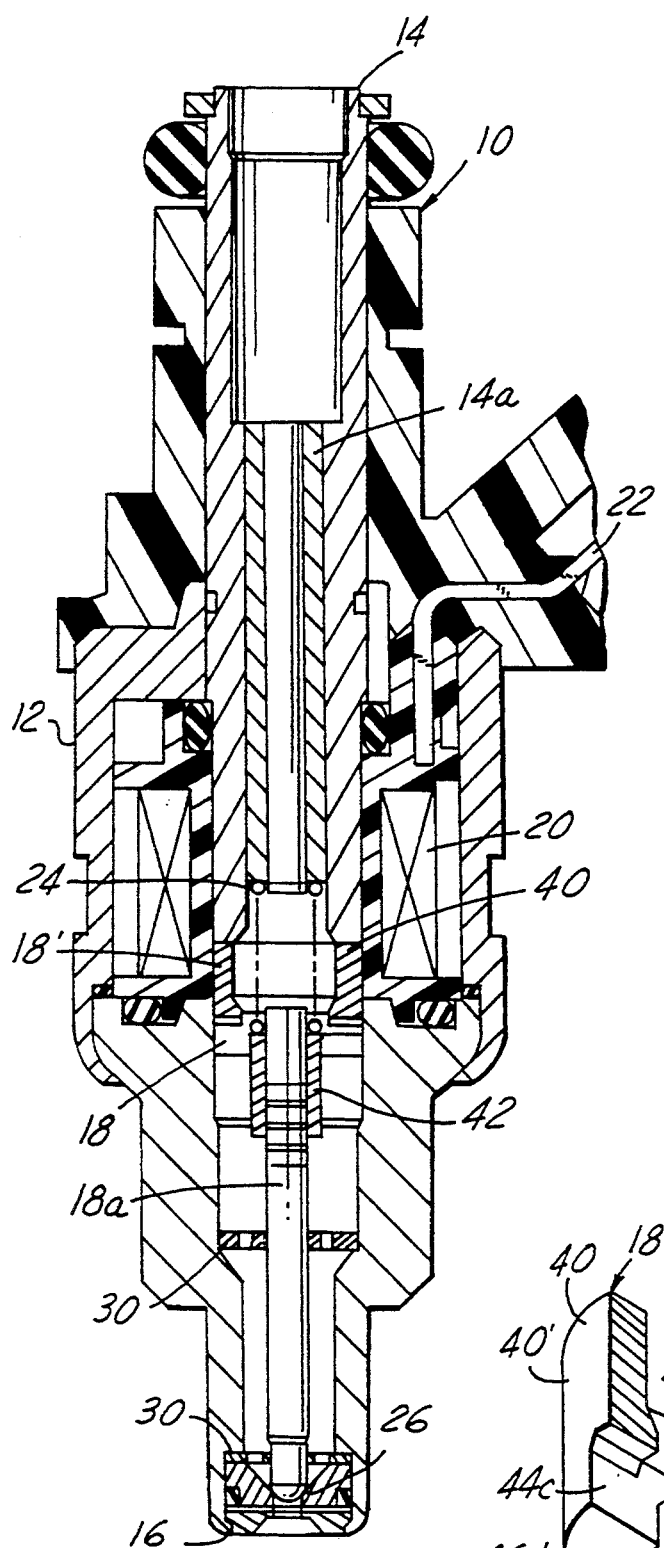
FIG. 1 is a longitudinal cross section view through an exemplary fuel injector having a novel armature assembly according to the present invention.
Figure 3:
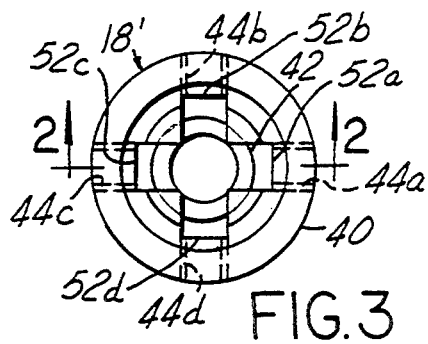
FIG. 3 is a top view of the armature by itself.
Figure 2:
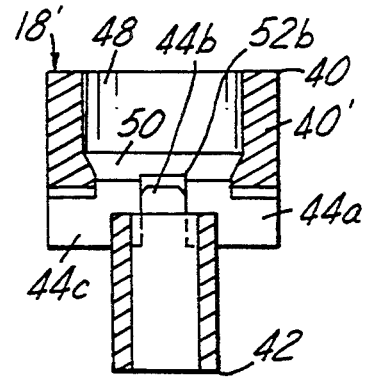
FIG. 2 is a longitudinal cross section view of the armature by itself on an enlarged scale.
Figure 4:
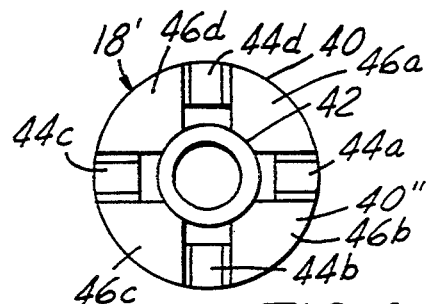
FIG. 4 is a bottom view of the armature by itself.
Figure 5:
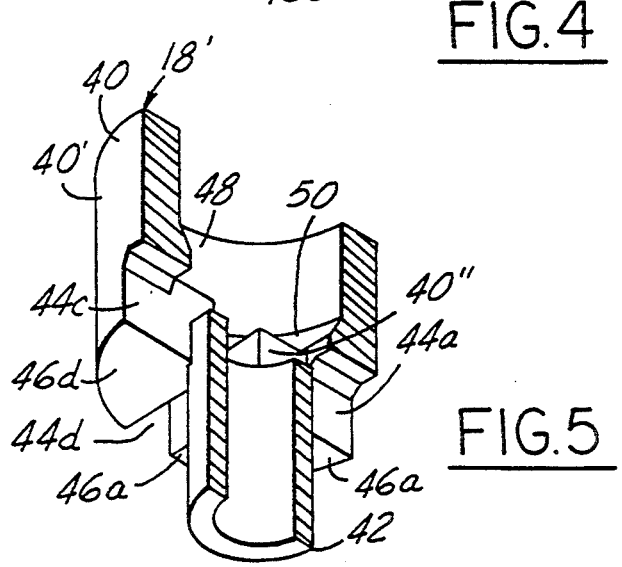
FIG. 5 is a perspective view of the armature, partly sectioned away.
Figure 6:
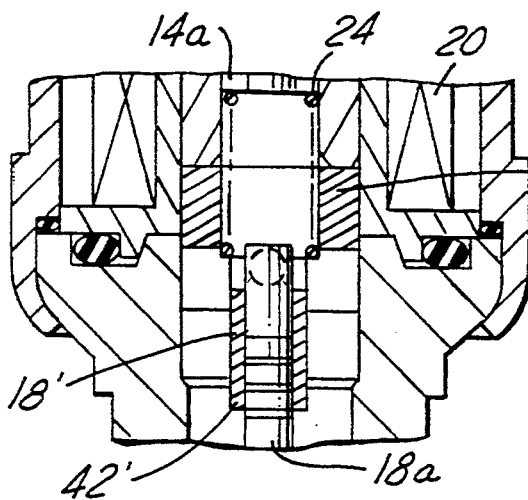
FIG. 6 is a fragmentary view of a modified form looking in the same direction as FIG. 1.
Figure 8:
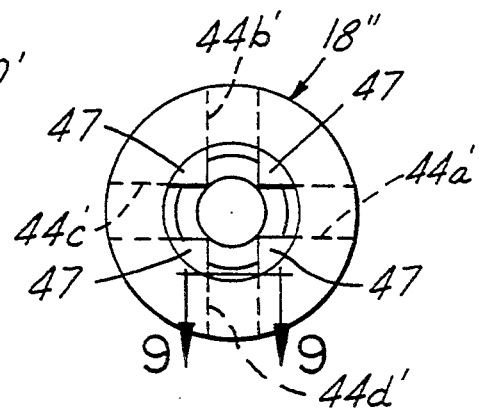
FIG. 8 is a view of the modified form looking in the same direction as FIG. 3.
Figure 9:
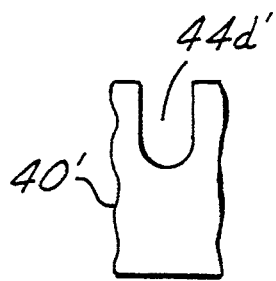
FIG. 9 is a fragmentary view in the direction of arrows 9—9 in FIG. 8.
Figure 7:
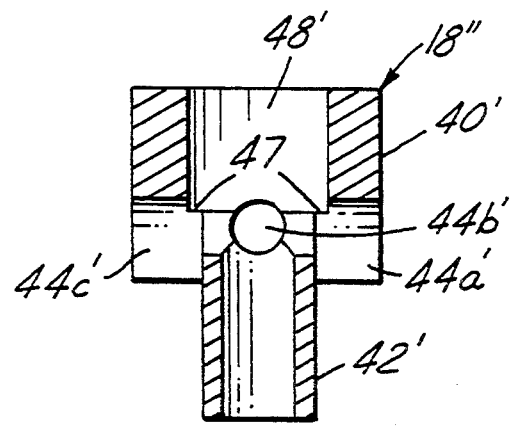
FIG. 7 is a view of the modified form looking in the same direction as FIG. 2.
Figure 10:
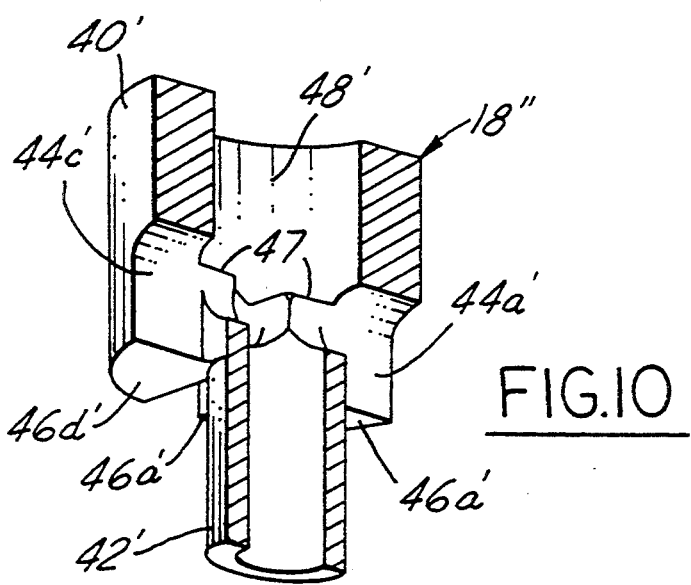
FIG. 10 is a perspective view of the modified form, partly sectioned away.

FIG. 1 illustrates a representative fuel injector 10 for injecting fuel into an internal combustion engine (not shown). It comprises housing structure, 12 generally, with an inlet connector tube 14 at the top end where pressurized fuel is introduced and a nozzle 16 at the bottom end from which fuel is injected. An internal fuel passage that extends between the inlet and nozzle ends contains an armature assembly 18 that consists of an armature 18' and a needle valve 18a. The electromechanical actuator mechanism comprises a bobbin-mounted solenoid coil 20 connected with electrical terminals 22 via which the fuel injector is to be operatively connected with an electrical circuit (not shown) for selectively energizing coil 20. A spring 24 acts on armature assembly 18 to bias the rounded tip end of needle valve 18a to seat on a valve seat 26 at the nozzle end of the fuel injector, thereby closing the fuel injector in the absence of coil 20 being energized, and it is this closed condition that is illustrated by FIG. 1. When coil 20 is energized, armature 18' is magnetically attracted toward coil 20, lifting needle valve 18a off seat 26 to open the fuel injector so that fuel is injected into the engine from nozzle 16, spring 24 being slightly compressed in the process since the upper end of the spring bears against the inner axial end of an adjustment tube 14a that has been fixedly positioned within tube 14. Fuel passing through tube 14 is constrained to flow through tube 14a.

One or more annular needle guides 30 is mounted within the fuel passage in association with needle 18a to provide some of the guidance for the longitudinal reciprocation of armature assembly 18 while allowing fuel to pass through to seat 26.

The relative organization and arrangement of these various parts are essentially the same as in the fuel injector of commonly assigned U.S. Pat. No. 4,610,080, although armature assembly 18 is different since it is the subject of the present invention. The novel part of assembly 18 is armature 18' (shown in detail in FIGS. 2-5) which has a larger diameter, thimble-shaped portion 40 (corresponding to the thimble-shaped portion of the known armature described earlier) and a smaller diameter, tubular-shaped portion 42 (corresponding to the necked-down portion of the known armature). For descriptive purposes, the smaller diameter portion 42 may be considered as merging with the larger diameter portion 40 in a partially telescopic manner, although armature 18' is but a single element having no individual parts assembled together. Portion 40 may be considered to comprise a sidewall 40' and an end wall 40", and as viewed axially, end wall 40" has four radial slots 44a, 44b, 44c, 44d at ninety degrees that create four quadrants 46a, 46b, 46c, 46d. Slots 46a and 46c lie on a first common diameter while slots 46b and 46d lie on a second common diameter that is at a right angle to the first. The finite slot width in the circumferential sense actually gives each quadrant a circumferential extent of somewhat less that ninety degrees. As viewed in cross section that is transverse to its length, each slot is generally three-sided, having its throat bounded by two parallel wall surfaces and a third wall surface at the base of the slot with a small chamfer at the intersection of the third wall surface with each of the two parallel wall surfaces.

It is into the four quadrants 46a, 46b, 46c, 46d that the merger of portion 42 with portion 40 occurs. The telescopic effect appears when one looks radially inwardly from the radially outer end of each slot 44a, 44b, 44c, and 44d. The axial dimension of each slot exceeds the extent to which portion 42 telescopes into portion 40 so that as viewed radially from the radially outer end of each slot, portion 42 appears unobstructed, and the ability to see the end of portion 42 that is axially coextensive with the slots is what is meant by the telescopic merger of portions 40 and 42. The four slots provide access to the full length of portion 42 for allowing crimping tools (not shown) to crimp portion 42 onto needle 18a. Furthermore, the O.D. of portion 42 is less than the I.D. of the immediately proximate end portion of portion 40 so that the radially inner end of each of the four slots 44a, 44b, 44c, and 44d is in communication with a central through-hole 48 in portion 40. Through-hole 48 includes a tapered shoulder 50 proximate portion 42, but the taper is interrupted by small notches 52a, 52b, 52c, and 52d of the respective slots at their intersections with shoulder 50. Thus, through-hole 48 and slots 44a, 44b, 44c, and 44d provide for fuel to flow through armature 18'.

Armature 18' is fabricated by powdered metal (sintering) or metal injection molding processes, both of which are known technologies. The resulting armatures have sufficient dimensional accuracy that subsequent machining operations on them are unnecessary. Consequently, they are far less prone to experiencing material separation that could give rise to objectionable debris when is use. Such fabrication processes provide cost-effective armature fabrication with suitable ferromagnetic and mechanical properties for this usage. Additional attributes of the construction of armature 18' in comparison to the known armature described above may include reduced mass and shorter overall length.

The modified form depicted in FIGS. 6-10 differs from the form of FIGS. 1-5 in certain constructional details of its armature 18" and in the relationship of spring 24 thereto. Those portions of armature 18" that correspond to analogous portions of armature 18' are identified by the same references numerals as in FIGS. 1-5, but with the addition of a prime. Hence, smaller diameter portion 42' merges with larger diameter portion 40' in a partially telescopic manner, and there are four radial slots 44a', 44b', 44c', and 44d' that create four quadrants 46a', 46b', 46c', and 46d'. Whereas the lower end of spring 24 bears against the upper axial end face of smaller diameter portion 42 in the embodiment of FIGS. 1-5, it bears against what may be considered as a circular ledge, or shoulder, 47 formed by the four quadrants 46a', 46b', 46c', and 46d'. This circular ledge is not circumferentially continuous since the quadrants are separated by the radial slots, and in fact the circular ledge comprises the four corners of the quadrants so marked by the reference numeral 47. The diameter of spring 24 can be seen to be larger in the embodiment of FIGS. 6-10 than in that of FIGS. 1-5 so that in the embodiment of FIGS. 6-10, fuel flow from the inner end of adjustment tube 14a has direct passage to slots 44a', 44b', 44c', and 44d' through the I.D. of the spring, and does not have to pass radially outwardly through the helical free space between convolutions of the spring helix.

While a presently preferred embodiment of the invention has been illustrated and described, it should be appreciated that principles are applicable to all embodiments that fall within the scope of the following claims. For example, while the armature has been described above as a powered metal part or an injection-molded metal part, it can also be a machined metal part, which may be preferable in low-volume production.

What is claimed is:

1. A solenoid-operated valve, such as a top-feed fuel injector, comprising housing structure having a fluid inlet and a fluid outlet connected by an internal fluid passage, a valve seat proximate said outlet, an armature assembly comprising an armature and a needle valve disposed within said passage and resiliently biased by a spring to urge said needle toward seating on said seat, and a solenoid coil that is energized to attract said armature and cause said armature assembly to lift said needle valve from said seat against the bias of said spring, said armature having a tubular-shaped smaller diameter portion merging coaxially with an end wall of a thimble-shaped, larger diameter portion, and an end of said needle valve fitting within said smaller diameter portion, characterized in that: said end wall of said larger diameter portion comprises one or more radial slots extending from an outside diameter of said thimble-shaped portion to intercept an axial through-hole of said thimble-shaped portion and dividing said end wall, as viewed axially, into one or more quadrants, said smaller diameter portion merges with said one or more quadrants, and as viewed in the radially inward direction from a radially outer end of said one or more slots, said smaller diameter portion is seen to have a telescopic fit with said thimble-shaped portion.

2. A valve as set forth in claim 1 characterized further in that at each said slot the axial extent of such telescopic fit is less than the axial dimension of the slot as measured immediately radially outwardly of said smaller diameter portion.

3. A valve as set forth in claim 1 characterized further in that there are four such slots creating four such quadrants.

4. A valve as set forth in claim 3 characterized further in that there are plural such slots and circumferentially alternate slots lie on a common diameter.

5. A valve as set forth in claim 3 characterized further in that there are plural such slots and two slots lie on a common diameter.

6. A valve as set forth in claim 3 characterized further in that there are plural such slots and each slot is generally three-sided in transverse cross section.

7. A valve as set forth in claim 1 characterized further in that said spring is a helical coil spring and is related to said armature such that fuel flow from said inlet to said slots can occur without fuel passing radially through a helical free space between convolutions of a helix defined by said spring.

8. A valve as set forth in claim 7 characterized further in that said helical coil spring bears on a shoulder of said armature that is disposed in said larger diameter portion.

9. A valve as set forth in claim 8 characterized further in that said shoulder is spaced axially of said smaller diameter portion.

10. A valve as set forth in claim 9 characterized further in that said shoulder is spaced radially outwardly of said smaller diameter portion.

11. An armature assembly for a solenoid-operated valve, such as a top-feed fuel injector, comprising an armature and a valve, said armature having a tubular-shaped smaller diameter portion merging coaxially with an end wall of a thimble-shaped, larger diameter portion, and an end of said valve fitting within and joined with said smaller diameter portion, characterized in that: said end wall of said larger diameter portion comprises one or more radial slots extending from an outside diameter of said thimble-shaped portion to intercept an axial through-hole of said thimble-shaped portion and dividing said end wall, as viewed axially, into one or more quadrants, said smaller diameter portion merges with said one or more quadrants, and as viewed in the radially inward direction from a radially outer end of said one or more slots, said smaller diameter portion is seen to have a telescopic fit with said thimble-shaped portion.

12. An armature assembly as set forth in claim 11 characterized further in that at each said slot the axial extent of such telescopic fit is less than the axial dimension of the slot as measured immediately radially outwardly of said smaller diameter portion.

13. An armature assembly as set forth in claim 11 characterized further in that there are four such slots creating four such quadrants.

14. An armature assembly as set forth in claim 13 characterized further in that there are plural such slots and circumferentially alternate slots lie on a common diameter.

15. An armature assembly as set forth in claim 13 characterized further in that there are plural such slots and two slots lie on a common diameter.

16. An armature assembly as set forth in claim 13 characterized further in that there are plural such slots and each slot is generally three-sided in transverse cross section.

17. An armature assembly as set forth in claim 11 characterized further in that said armature is a sintered metal.

18. An armature assembly as set forth in claim 11 characterized further in that said armature is an injection-molded metal.

19. An armature assembly as set forth in claim 11 characterized further in that said armature is a machined metal.

* * * * *